(12) United States Patent
Yang et al.

(10) Patent No.: US 7,067,188 B1
(45) Date of Patent: Jun. 27, 2006

(54) POLYMERIC ARTICLES HAVING A TEXTURED SURFACE AND FROSTED APPEARANCE

(75) Inventors: Shi-Jun Yang, Maple Glen, PA (US); Fabio Giberti, Paderno Dugnano (IT); Ralph Howard Clark, Palmyra, NJ (US); Leslie Alan Cohen, Langhorne, PA (US)

(73) Assignee: Arkema, Puteaux (FR)

( * ) Notice: Subject to any disclaimer, the term of this patent is extended or adjusted under 35 U.S.C. 154(b) by 0 days.

(21) Appl. No.: 09/480,193

(22) Filed: Jan. 10, 2000

Related U.S. Application Data

(60) Provisional application No. 60/116,552, filed on Jan. 21, 1999.

(51) Int. Cl.
*B32B 5/16* (2006.01)
*B32B 27/36* (2006.01)
*B32B 27/06* (2006.01)
*B32B 27/00* (2006.01)

(52) U.S. Cl. .................. 428/327; 428/412; 428/480; 428/500; 524/80; 524/81

(58) Field of Classification Search .......... 524/80, 524/81; 428/323, 327, 412, 480, 500
See application file for complete search history.

(56) References Cited

U.S. PATENT DOCUMENTS

| | | | | |
|---|---|---|---|---|
| 3,345,434 A | 3/1967 | Griffith | | 260/901 |
| 3,793,402 A | 2/1974 | Owens | | |
| 3,992,486 A | 11/1976 | Lang | | 260/885 |
| 4,000,216 A | 12/1976 | Lang | | 260/857 |
| 4,876,311 A * | 10/1989 | Hennig et al. | | 525/229 |
| 5,063,259 A | 11/1991 | Wanat et al. | | 523/201 |
| 5,321,056 A * | 6/1994 | Carson et al. | | 523/201 |
| 5,346,954 A | 9/1994 | Wu et al. | | |
| 5,395,882 A | 3/1995 | Siol et al. | | 525/82 |
| 5,458,964 A * | 10/1995 | Okazaki et al. | | 428/323 |
| 5,621,028 A | 4/1997 | Lichtenstein et al. | | 524/91 |
| 5,705,580 A | 1/1998 | Giberti | | |
| 5,733,992 A | 3/1998 | Relvini et al. | | 526/201 |
| 6,077,575 A * | 6/2000 | Minghetti | | 428/15 |

FOREIGN PATENT DOCUMENTS

| | | |
|---|---|---|
| EP | 0683182 A2 | 11/1995 |
| EP | 0774471 A1 | 5/1997 |
| GB | 222002 | 12/1989 |
| JP | 59-038253 | 3/1984 |
| JP | 61-159440 | 1/1985 |
| JP | 61-078859 | 4/1986 |
| JP | 04-279668 | 5/1992 |

OTHER PUBLICATIONS

Haward, R.N. and Young, R.J., Editors, "The Physics of Glassy Polymers", 1997, Chapter 8, 8.1, Bucknall, C.B., "Rubber Toughening" Paul, D.R. and Bucknall, C.B., Editors, "Polymers Blends", vol. 2: Performance, 1999, Page 157, 170 and 173 Brandrup, J.E., Immergut, H. Grulke, E.A., "Polymer Handbook", 1975, S. III–241 –III 244 Calculation of the difference in refractive index, Ref. EP. 1022115 "Polymeric articles having a textured surface and frosted appearance".
Schildknecht, C.E., "Polymerization Processes", new York, Wiley & sons (1977) S. 106–142 Saechtling "Kunststoff-Taschenbuch", Munchen, Wein, Hanser, 26 Ausgabe (1995), S. 428–429.

* cited by examiner

*Primary Examiner*—Holly Rickman
(74) *Attorney, Agent, or Firm*—Thomas F. Roland

(57) ABSTRACT

Disclosed is a polymeric article having a frosted and/or surface textured finish made from a polymeric resin comprised of a polymeric matrix and polymeric particles which are substantially spherical, highly crosslinked, have a mean particle size of between 15 and 70 micrometers and have a particle size distribution between 10–110 micrometers.

11 Claims, No Drawings

POLYMERIC ARTICLES HAVING A TEXTURED SURFACE AND FROSTED APPEARANCE

REFERENCE TO RELATED APPLICATION

This application claims the benefit of U.S. Provisional Application Ser. No. 60/116,552, filed Jan. 21, 1999.

BACKGROUND OF THE INVENTION

1. Field of the Invention

The present invention relates to polymeric articles having a textured surface and frosted appearance and to resins for producing such articles.

2. Related Art Statement

In lighting applications, and point of purchase, and cosmetic/decorative markets, people are always looking for new and innovative products that can provide flexibility for designs and fabrications at a competitive cost.

Presently, there is not a successful plastic product in this market that can be used in a one-step process and provide the properties and appearance needed to replace sand blasted glass material. It would be desirable to have a resin that could be used for sheet and profile extrusion applications and that creates a product with a surface texture and frosted appearance.

Such a plastic material could reduce the production and fabrication costs and provide design flexibility for end users. Similar thermoplastic products are traditionally made by surface treatment, such as, sand blasting and surface pattern fabrication, and by adding inorganic filler, such as, barium sulfate, calcium carbonate, titanium dioxide, silica, etc. Such inorganic fillers are normally difficult to disperse evenly in polymer matrix material, reduce greatly the light transmission of the polymer, and do not generate the desired surface texture. Also, the filler particles have a tendency to deteriorate physical properties of the polymer.

Fine particles (i.e. less than 15 micrometers) of a copolymer made by an emulsion polymerization process are sometimes added into a plastic matrix to generate a light diffusion effect for display and light panel applications, for example, U.S. Pat. No. 5,346,954. However, this type of product tends to soften the polymer matrix and can not produce the textured surface so often preferred by the end user.

SUMMARY OF THE INVENTION

The present invention provides a novel extruded or profile extruded polymeric article having a frosted and/or surface textured finish, preferably both. Since the article is a thermoplastic material, it can be recycled, re-extruded, or injection molded to generate the desired appearance.

In one embodiment the article is comprised of a polymeric matrix and polymeric particles in which the particles are substantially spherical, are highly crosslinked, have a mean particle size of between 15 and 70 micrometers and have a particle size distribution between 10–110 micrometers.

In another embodiment the article is comprised of a dispersion of cross-linked fine particles in a substrate of a polymer matrix; the fine particles are comprised of 0–100% styrene, 0–100% alkyl methacrylate, 0–100% alkyl acrylate and crosslinking agent.

In another embodiment the article is comprised of a dispersion of cross-linked fine particles in a substrate of a polymer matrix; the fine particles are comprised of 0–50% styrene, 45–100% alkyl methacrylate or alkyl acrylate, and 0.01–5% crosslinking agent.

In another embodiment the article is comprised of a dispersion of crosslinked fine particles in a substrate polymer comprising mainly methyl methacrylate; the fine particles are comprised of 0–50% styrene, 45–100% alkyl methacrylate or alkyl acrylate, and 0.01–5% crosslinking agent.

The purpose of the highly crosslinked spherical particles in the present invention is to impart to the thermoplastic composition a textured surface and a frosted appearance. The frosted appearance of the thermoplastic compositions is achieved through the mismatch of the refractive indexes, $\Delta n>0.02$, of the fine particles and thermoplastic matrices. The surface texture is controlled by the degree of crosslinking and mean size of the fine particles.

Another aspect of the invention is the resin composition used to produce the article. In one embodiment, the resin comprised of a) 20–90% polymethyl methacrylate or alkyl methylacrylate/alkyl acrylate copolymer based matrix;
b) 0–50% modifiers; and
c) 5–60% highly crosslinked spherical beads comprised of about
   0–100% styrene,
   0–100% alkyl methacrylate,
   0–100% alkyl acrylate and
   crosslinking agent In another embodiment of the invention, the resin composition is comprised of a) 20–90% polymethyl methacrylate based matrix,
b) 0–50%, preferably 5–50%, modifiers, and
c) 5–30% highly crosslinked spherical beads comprised of styrene and/or methyl methacrylate and a crosslinking agent.

In another embodiment of the invention, the resin is comprised of a) 20–90% polymethyl methacrylate based matrix,
b) 0–50%, preferably 5–50%, modifiers, and
c) 5–30% highly crosslinked spherical beads comprised of
   0–50% styrene
   100–50% alkyl alkylacrylate or alkyl acrylate, or combination of both
   0.1–2.5% crosslinking agent, wherein the beads have a mean particle size of 15–70 micrometers, and a particle size distribution of between 10–110 micrometers.

In another embodiment of the invention, the resin is comprised of a) 70–85% polymethyl methacrylate based matrix; and
b) 15–30% highly crosslinked spherical beads comprised of
   15–35% styrene
   65–85% methyl methacrylate
   0.5–1.5% allylmethacrylate;

wherein the beads have a mean particle size of 15–70 micrometers, and a particle size distribution of between 15–110 micrometers.

DETAILED DESCRIPTION OF THE INVENTION

Polymers, such as, acrylic polymers, PET, PS, ASA, SAN, MMA/S, PVC, ABS terpolymer, polycarbonate, polyester (such as poly(butylene terephthalate) and poly(ethylene terephthalate), MBS copolymer, HIPS, acrylonitrile/acrylate copolymer, acrylonitrile/methyl methacrylate copolymer, impact modified polyolefins and impact modified PVC, etc, or mixtures thereof, can be used as the polymeric matrix. Preferably the polymer is an acrylic, more preferably, an impact modified acrylic polymer.

The term "acrylic polymer(s)" as used herein means 1) alkyl methacrylate homo polymers,
2) copolymers of alkyl methacrylates with other alkyl methacrylates or alkyl acrylates or other ethylenically unsaturated monomers,
3) alkyl acrylate homo polymers, and
4) copolymers of alkyl acrylates with other alkyl acrylates or alkyl methacrylates or other ethylenically unsaturated monomers.

The alkyl group can be from 1–18 carbon atoms, preferably 1–4 carbon atoms. Preferred are polymethyl methacrylate based matrix and copolymers of methyl methacrylate with from about 0.1–20% alkyl acrylates, wherein the alkyl contains 1–4 carbon atoms, alkyl acrylic acids wherein alkyl contains 1–18 carbon atoms.

Preferably the thermoplastic matrix material comprises a polymer or copolymer of methyl methacrylate(MMA); typical copolymers include 80 to 99% MMA and 1 to 20%, preferably 1 to 5%, of (C1–C10) alkyl acrylates, such as methyl acrylate and ethyl acrylate(EA). A suitable commercially available poly(methyl methacrylate) type thermoplastic matrix material is Plexiglas® V-grade molding powder, such as Plexiglas® V(825),V(825)HID, V(045),V(052) and V(920) etc.

The polymer matrix is conveniently prepared by conventional cell casting or melt extrusion processes and is typically provided in particulate form. In addition, thermoplastic matrix materials may be prepared by a conventional bulk process(for example, a continuous flow stirred tank reactor (CFSTR) process), solution, suspension or emulsion polymerization techniques, in which case conventional isolation processes used to recover the polymer in particulate form include, for example, filtration, coagulation and spray drying.

The matrix may also include other modifiers or additives which are well known in the art. For example, the composition may contain impact modifiers, external lubricants, antioxidants, flame retardants or the like. If desired, ultraviolet stabilizers, flow aids, metal additives for electronic magnetic radiation shielding such as nickel coated graphite fibers, antistatic agents, coupling agents, such as amino silanes, and the like, may also be added.

One of the processes of incorporating the modifier is to make the modified matrix by an emulsion process.

A rubber modifier can be added to the matrix, especially an acrylic polymer matrix, to enhance its performance properties.

In an emulsion process, particles generated are usually small, 0.05–5 micrometers. Initiators used for the emulsion process are water soluble. The final product from an emulsion process is a stable latex which is normally not suitable for filtration. The latex emulsion is typically spray dried or coagulated/wash dried.

The emulsifying reagents are well known to those skilled in the art. Useful emulsifying agents include common soaps, alkyl benzenesulfonates, such as: sodium dodecyl benzenesulfonate, alkylphenoxypolyethylene sulfonates, sodium lauryl sulfate, salts of long chain amines, salts of long-chain carboxylic and sulfonic acids, etc. In general, the emulsifier should be compounds containing hydrocarbon groups of 8–22 carbon atoms coupled to highly polar solubilizing groups such as alkali metal and ammonium carboxylate groups, sulfate half ester groups, sulfonate groups, phosphate partial ester groups, and the like.

The blend of the multi-stage polymer(rubber modifiers) with the thermoplastic polymer can be accomplished by any known method, such as dispersing the multi-stage polymer in a monomer mixture used to prepare the thermoplastic polymer or in a monomer-polymer syrup mixture which together would provide the desired thermoplastic polymer. Alternatively, the multi-stage polymer can be placed in a casting mix in the form of an emulsion, suspension or dispersion in water or in an organic carrier; the water or organic carrier can then be removed before or after casting into the final thermoplastic polymer form. The multi-stage polymer may also be blended with the thermoplastic polymer by extrusion compounding. Additional specific methods and details of blending the thermoplastic polymer and impact modifiers are disclosed in U.S. Pat. No. 3,793,402.

A preferred thermoplastic matrix material is impact modified poly(methyl methacrylate) commercially available as Plexiglas® DR101, MI-4, and MI-7 molding powder. Plexiglas® in North and South America, and Oroglas® in Europe and Asia are trademarks of Elf Atochem North America, Philadelphia, Pa., USA.

The matrix material can be made by many different processes known in the art, including, continuous cell casting, emulsion, suspension, bulk polymerization, and continuous stirred tank reactions(CFSTR), etc. Each of these methods utilize free radical polymerization chemistry. In the continuous cell casting process of acrylic resins, the viscous polymer/monomer mixture, often referred to as syrup and which has about 30–50% polymer conversion, is fed between two stainless steel belts at a controlled temperature. Polymer conversion is completed with the continuous moving belt. In an emulsion process, the major components are monomers, water, emulsifiers, water soluble initiators, and chain transfer agents. The water to monomer ratio is controlled between 70:30 and 40:60. A core/shell particle structure can be achieved through grafting by an emulsion process, which is often a preferred process for making impact modifiers.

The highly crosslinked particles may be made by a suspension process. The composition of the particles may be 0–50% styrene, 45–100% alkyl methacrylate or alkyl acrylate, or a mixture of both, and 0.01–5% crosslinking agent. A preferred typical composition is 10–50% styrene, 50–90%, MMA, and 0.1–2.5% crosslinking agent.

Crosslinking monomers suitable for use as in the spherical polymer particles (beads) are well known to those skilled in the art, and are generally monomers copolymerizable with monomers present, and having at least two or more unsaturated vinyl groups which have approximately equal or different reactivities, such as divinyl benzene, glycol di- and tri-methacrylate and acrylates, ethylene glycol dimethylacrylate, allyl methacrylates, diallyl maleate, allyl acryloxypropionates, butylene glycol diacrylates, etc. Preferred crosslinkers are ethylene glycol dimethacrylate, divinylbenzene, and allyl methacrylate. Most preferred is allyl methacrylate.

"Highly crosslinked" means that the particulate material can not be dissolved at all in a strong organic solvent, such as tetrahydrofuran (THF) or methylene chloride(MDC). The swell ratio measurement, which measures the particle size change in an organic solvent after a certain period of time, is normally a test method to determine the degree of crosslinking. A low swell ratio, no soluble fraction in a MDC/THF solvent, and the retention of particle integrity are the indications of a highly crosslinked acrylic polymer. The degree of crosslinking can also be monitored through surface hardness and surface gloss measurements. The related test methods are American Standard Test Methods: ASTM D785 and ASTM D2457.

The beads have a mean particle size of 15–70 micrometers, preferably, 25–55 micrometers, and a particle size distribution of between 10–110 micrometers. The particle size may be controlled by agitation speed, reaction time, and level and type of suspending agents. The "mean particle size" is a weight mean. As used herein and in the following sections and appended claims, the term "weight mean" or "weight percent" means average by weight or the percent by weight of each component based on the total weight of composition. The light scattering methods used for particle size determination are ASTM:D4464, B822, and ISO13321:1996(E).

The composition of the polymer particles may be analyzed by a pyrolysis GC/MS spectrometer where the polymer material is pyrolyzed at an elevated temperature and the decomposed components are analyzed further for a quantitative determination.

In order for the article produced by the blend of the resin and particles to be frosted, the refractive index of the crosslinked particles has to be different from that of the matrix material. The difference in refractive index should be $\Delta n > 0.02$. The crosslinked spherical particles have mismatched refractive indices with many thermoplastic polymers, such as, but not limited to, acrylic polymers (defined as above), polycarbonate, polyvinyl chloride and the like, polystyrene, PET, PETG, imidized polymers of methyl methacrylate, copolymer of acrylonitrile and styrene, and copolymer of styrene and MMA.

The spherical particles may be made by a suspension process wherein the water is a continuous phase serving as a heat transfer medium and the polymerization is carried out in monomer droplets. In a suspension process the viscosity change during the polymer conversion is very small; therefore, the heat transfer is very efficient. The agitation speed, and composition and level of the suspending agent are critical factors in determining the particle size distribution. The typical particle size from suspension is about 10–1000 micrometers. More detailed information about the suspension process can be found in U.S. Pat. No. 5,705,580, EP 0,683,182-A2, and EP 0,774,471-A1. Typical examples of using the suspension process for the spherical particles are provided in Examples 1, 2A, 2B, and 2C respectively.

It is within the scope of the present invention to color the crosslinked beads during the suspension process. The advantages of using colored beads over a colored matrix material are process flexibility, cost reduction, better color dispersion, reduced surface gloss, deep/natural color appearance and a reduction in cleaning process equipment between product changes.

The surface textured and frosted article of the present invention is a polymeric matrix which contains the highly crosslinked spherical particles which have a mean particle size between 15 and 70 micrometers, and a particle size distribution between 0.2–110 micrometers.

A particularly preferred embodiment has the composition a) 70–85% polymethyl methacrylate based matrix; and
b) 15–30% highly crosslinked spherical beads comprised of
   15–35, preferably 24.9% styrene
   65–85, preferably 74.0% methyl methacrylate, and
   0.5–1.5, preferably 0.9% allyl methacrylate.

The article of the present invention is produced by extrusion compounding together the crosslinked particles(beads) made from the suspension process, the optional modifiers, and the polymer matrix on a single or twin screw extruder to produce an article having a surface textured and frosted appearance.

An example of the process for producing an article of the present invention is as follows:

The cross-linked spherical beads may be dried in an hot air oven before compounding into a thermoplastic matrix through, for example, a Killion extruder equipped with a two-stage medium work screw and a vacuum venting system. A WP twin screw extruder can also be used for the compounding. The beads, polymer, and additives are added into the extruder through different feeders on the extruder. The conveyer system for spherical beads should be a closed system to avoid safety hazards and dust hazards. The beads are fed into the Killion extruder through a K-TRON® hopper with an auger screw by gravimetric control or by volumetric feeding control. The temperature profile which can be used for making the frosted article when the composition contains 10–35% suspension beads, made by Example 2C, and 65–90% PMMA made by a free radical polymerization process, can be as follows:

Typical process conditions for compounding extruder:

| Feed Zone: | 235° C. |
|---|---|
| Compression Zone: | 245° C. |
| Metering Zone: | 250° C. |
| RPM (revolution per minute) | 70–100 |

The extruded article is oven dried before further usage.

The frosted article can be further processed the same way as normal thermoplastics, such as, by profile extrusion, sheet extrusion, injection molding, and plunge molding, etc., into various final products. The product resulting from sheet or profile extrusion will have a textured surface and frosted appearance while the product resulting from injection molding will have a frosted look.

The frosted article(for example extruded sheet product) can also be produced by feeding directly the crosslinked particles with the matrix resins into a sheet extruder or injection molding machine to eliminate the compounding step. The precompounded resin is better suited for commercial applications and user friendly because direct feeding of beads requires special equipment to handle the slippery beads.

The crosslinked beads from the suspension process can also be extrusion compounded into other polymers, such as, PC, PET, PS, ABS terpolymer, ASA copolymer, HIPS, SAN, PVC, modified PVC, MBS copolymer, etc., to generate a similar effect.

Unlike other surface treated product, the frosted appearance and textured surface from this invention can be maintained through thermoforming, bending, and other post-treatments. The "textured surface" can be generated through conventional extrusion or profile extrusion equipment without the requirements of a specific patterned roll or polishing equipment, providing process flexibility for the end users.

By the term "textured surface" as used herein is meant a minimum surface roughness of 0.5 um to as high as 30 um or higher. Surface Roughness is determined by a TENCOR Alpha-step 500 surface profiler, the reference method number can be found in ASME: B46.1.1, B46.1.2, B46.1.12, ASME Y14.36. ASME is an abbreviation for the American Society of Mechanic Engineering.

One of the advantages of the current invention is that the Total White Light Transmission (TWLT) is much higher than the similar commercial products filled by inorganic fillers, such as barium sulfate or color concentrate, to achieve a frosted appearance. For example, barium sulfate pigmented PMMA has a 47% TWLT while the frosted product of the present invention has a 84% TWLT, and both have a similar frosted appearance. The sample made from suspension beads described in Example 2C allows more light to be transmitted in lighting applications.

TWLT is measured by a Hunterlab colorimeter-D25 model, ASTM: E1331 and E1164. The frosted appearance can be determined by an opacity measurement. The higher the opacity number, the better the hiding power of the thermoplastic sample. To have a frosted appearance, the minimum opacity number should be about 10%. The loading of suspension beads and mismatch of refractive index between beads and matrix material would affect the hiding power of the sample which is measured by the opacity number. The related standard methods for these measurements are ASTM D2805–80, ASTM D589–65, TAPPI T-425, TAPPI T-519.

The composition of the current invention can be used for profile and sheet extrusion to generate final parts for lighting, signs, point of purchase and cosmetic displays, containers, home and office decorations, furniture applications, shower doors, and office doors where privacy is preserved without sacrificing loss of light.

The present invention will now be exemplified in more detail by referencing the following, non-limiting examples.

EXAMPLE 1

The following is a typical recipe for suspension polymerization which gives a weight mean particle size of ~35 microns.

The following ingredients are mixed and reacted to form particles of P(MMA/styrene/ALMA)

| Deionized Water | 1772 gram |
|---|---|
| p(dimethyldiallylammonium chloride) | 32 gram |
| NaOH | 0.048 gram |
| NaCl | 72 gram |
| Gelatin | 2.16 gram |
| DI water for gelatin (90° C.) | 144 gram |
| MMA | 465.5 gram |
| styrene | 134.5 gram |
| ALMA | 4.86 gram |
| butyl peroctoate | 6 gram |

The water phase in this recipe is composed of deionized water, p(dimethyldiallylammonium chloride), sodium hydroxide, sodium chloride, and gelatin. The organic phase is composed of styrene, MMA, allyl methacrylate, and butyl peroctoate. The p(dimethyldiallyammonium chloride) and DI water are charged into a reactor and NaOH and NaCl are added into the mix for pH modification. The target pH is in the range of 9.5–10.5. The oxygen is removed by sweeping nitrogen gas through the reactor and heating the solution to 90° C. 2.16 g gelatin is dissolved into 144 g DI water at 75° C. in a separate container with constant agitation until complete dissolution occurs. The gelatin solution is then added into the reactor. The reactor temperature is adjusted to 80° C. and the monomer mix which is composed of MMA, styrene, allyl methacrylate, and t-butyl peroctoate is charged into the reactor with an agitation of 350 RPM. The reactor is heated gradually to 90° C. over 2 hrs and polymer conversion is completed in about 4 hrs. Polymer in the form of fine particles is obtained. The crosslinked beads are then centrifuged, washed, and oven dried for extrusion compounding. The resulting particles are highly crosslinked which contain 0.81% ALMA in their composition and have a weight mean size of 35 microns.

EXAMPLE 2A
Preparation of Crosslinked Microbeads by a Suspension Process

The crosslinked beads with a weight mean particle size of 20–50 microns can be prepared through the following procedure and recipe:

| DI H2O | 245 parts |
|---|---|
| Polyvinylalcohol | 5 parts |
| Monomer mix: | 74 parts methyl methacrylate |
| | 24.6 parts styrene |
| | 0.8 parts allyl methacrylate |
| | 0.6 parts lauroyl peroxide |

All portions are measured by weight.

245 parts deionized water and 5 parts polyvinyl alcohol are fed into a stirred, temperature controlled, and pressure-resistant reactor at 40° C. The reactor is deoxygenated by a nitrogen flow and stirred until the complete dissolution of polyvinyl alcohol occurs. A monomer mix described above is then fed into the reactor. The reactor is sealed under nitrogen, and pressurized at 100 KPa. The mixture is heated gradually up to 110° C. over 120 minutes and kept at this temperature for 15 minutes and then cooled for discharge. After centrifuging, washing, and drying, the microbeads with a weight mean of 20–30 micrometers can be separated from waste water for sample preparation.

EXAMPLE 2B
Preparation of Beads by Polymeric Suspending Agent

The crosslinked beads can also be prepared by using a mixture of polymeric suspending agent and pulp water generated from previous suspension process to minimize the discharge of waste water to the environment. This process improves the separation efficiency of microbeads from suspending solution and increases yields of raw materials.

| Step 1: Preparation of suspending agent | |
|---|---|
| Raw materials: | |
| NaOH (99.0%) | 48 parts |
| DI H2O | 702 parts |
| AMPS | 250 parts |
| (2-acrylamido-2'-methylpropansulphonic acid) | |
| Potassium persulphate | 0.075 parts |
| Sodium methabisulphite | 0.025 parts |

48 parts by weight of NaOH and 702 parts by weight of deionized water are charged into a reactor and stirred till NaOH dissolves. 250 parts by weight of AMPS are slowly added into the reactor, and then the PH value is adjusted to between 7 and 8 by addition of either NaOH or AMPS. Remove oxygen from the reactor by nitrogen flow and heat the reactor to 50° C. Add to the reactor 0.075 parts potassium persulphate and 0.025 parts sodium methabisulphite. After 60 minutes, the reaction should be completed and 4000 parts by weight of deionized water is added into the reactor, diluting the solution to about 5.0% solids level. The prepared solution is ready to be used as the suspending agent for making microbeads in the following step.

Step 2 Preparation of Crosslinked Beads

Raw materials:

| | |
|---|---|
| Deionized water | 193 parts |
| AMPS solution from step 1 | 7 parts |
| Monomer mix (listed blow) | 100 parts |
| MMA | 74 parts |
| Styrene | 24.95 parts |
| Allyl Methacrylate | 0.8 parts |
| t-butyl peroxy-2-ethylhexanoate | 0.25 parts |

193 parts by weight of deionized water and 7 parts by weight of solution from step 1 are charged into a reactor with agitation. Oxygen is removed from reactor by nitrogen flow. The reactor is sealed and pressurized at 100 kPa and heated to 110° C. in 150 minutes. The agitation speed should be maintained at 100 RPM or higher. After the reaction is completed, maintain the reactor temperature at 110° C. for another 15 minutes to reduce the residual monomer before cooling for discharge. The microbeads with a weight mean about 35–60 microns are separated by centrifuging, washing, and oven drying and can be used for frosted acrylic sample preparation. The waste water which contains a total dry residues of 0.62% (at 160° C.), composed of 0.2% by weight suspending agent and fractions of beads smaller than a few micometers, can be used as the suspending agent for subsequent process.

EXPERIMENT 2C
Preparation of Crosslinked Beads Using Waste Water

The microbeads can also be prepared using waste water from Example 2B. The following raw materials are charged into a reactor to make the highly crosslinked particle for frosted acrylic sample preparation.

| | |
|---|---|
| Waste water (from example 2B) | 300 parts |
| Monomer mix | 100 parts |
| Composed of: | 74 parts MM |
| | 24.6 parts styrene |
| | 0.8 parts ALMA |
| | 0.6 parts laurolyl peroxide |

Introduce 300 parts of waste water from example 2B into a pressurized reactor and heat to 80° C. and then introduce 100 parts of monomer mix into the same reactor with continuous stirring. Remove the oxygen from the reactor by a nitrogen flux. Pressurize the reactor at 100 Kpa and seal. Heat the reactor gradually to 110° C. in 150 minutes. After complete conversion, the reactor temperature is maintained at 110° C. for another 15 minutes and then cooled down for discharge. Microbeads with a weight mean particle size of 50 microns are separated from the solution by centrifuging, washing, and oven drying.

EXAMPLE 3

In order to evaluate the compositional effect of different particles in thermoplastic matrixes, samples are made by the following method for evaluation of their appearance, transmission light efficiency, and surface texture effect.

The EX III-A sample is made by compounding 25% suspension beads which have a composition of 74.3% methyl methacrylate, 24.8% styrene, and 0.9% allyl methacrylate, into 75% of an impact modified PMMA matrix (MMA/BA/Styrene/ALMA) on a Killion extruder equipped with a medium work two stage screw and a vacuum vent for monomer/moisture removal.

The EX III-B sample is made by compounding 25% suspension beads which have a composition of 79.3% methyl methacrylate, 19.8% butyl acrylate, and 0.9% allyl methacrylate, into 75% of an impact modified PMMA matrix (MMA/BA/Styrene/ALMA) on a Killion extruder.

The EX III-C sample is made by compounding 20% inorganic beads, Scotchlite Glass Bubbles sold by 3M, into 80% of an impact modified PMMA matrix (MMA/BA/Styrene/ALMA) through a Killion extruder.

The samples used in this example are made through a two step extrusion process: compounding the different particles with impact modified PMMA matrix to make a resin; and passing the resin through a sheet extruder to make 0.125" thickness sheet for testing. The temperature profiles used for resin compounding and sheet extrusion are listed in the following table:

| Resin compounding conditions | | | | |
|---|---|---|---|---|
| Feed Zone | Compression Zone | Metering Zone | Die Zone | RPM |
| 235° C. | 245° C. | 250° C. | 275° C. | 85 |

| Sheet Extrusion Conditions | | | | | |
|---|---|---|---|---|---|
| Feed Zone | Compression Zone | Metering Zone | Die Zone | RPM | Roll temp. |
| 225° C. | 240° C. | 240° C. | 260° C. | 85 | 82° C. |

| Sample | Wt % load | Bead type | Mean particle size[1] | Appearance | Total white light transmission (TWLT)[2] | Surface roughness[3] |
|---|---|---|---|---|---|---|
| ExIII-A | 25 | crosslinked Sty/MMA/ALMA | 31.8 | translucent/textured surface | 83.5% | 9.6 um |
| ExIII-B | 25 | crosslinked BA/MMA/ALMA | 57.1 | white agglomerate/turbid texture surface | 78.9% | 4.3 um |
| –ExIII-C | 20 | Inorg. glass beads | 55 | Opaque/proc. problm./brittle incompatible | N/A | N/A |

[1]Light scattering method was used to determine weight mean particle size.
[2]TWLT was measured by a Hunterlab colorimeter-D25 model, ASTM:E1331 and E1164
[3]Surface Roughness was determined by a Tencor ® Alpha-step 500 surface profiler, ASTM:method B46.1.1, B361.2, and Y14.36.

Conclusions: The suspension beads of EX III-A give the best result for frosted resin. It is easier to disperse the suspension particles of EX III-A than the other two compositions, EX III-B and EX III-C, in a thermoplastic matrix. Although the glass beads in EX III-C has a similar particle size range, it can not generate the desired surface texture and light transmission efficiency. The glass beads are not compatible with the thermoplastic material at higher loadings and deteriorate the polymer's physical properties. The parts made in EX III-C are very brittle and can not pass the visual test.

EXAMPLE 4

The following table shows the results of using the crosslinked spherical particles made by the method of Example 2C for other thermoplastic matrixes. The sample appearance, the surface roughness, and the total white light transmission are measured for different samples. The samples are made by extrusion compounding the crosslinked beads with PVC, PC, Polystyrene, and PMMA polymer material in a 20% suspension particles and 80% polymer matrix material on a Killion extruder with a two stage medium work screw and a vacuum vent. The resins are then passed through a sheet extruder.

The following conditions are used for sample preparation:

Temperature Profile for Extrusion Compounding

| | Feed Zone | Compression Zone | Metering Zone | Die Zone | RPM |
|---|---|---|---|---|---|
| PVC-1 | 182° C. | 182° C. | 182° C. | 182° C. | 100 |
| PC-1 | 249° C. | 271° C. | 265° C. | 265° C. | 80 |
| PSY-1 | 238° C. | 238° C. | 243° C. | 243° C. | 100 |
| PMMA-1 | 220° C. | 230° C. | 235° C. | 240° C. | 100 |

The sheet extrusion conditions for each of the samples are listed in the following table:

Temperature Profile for Sheet Extrusion

| | Feed Zone | Compression Zone | Metering Zone | Die Zone | RPM | Roll Temp |
|---|---|---|---|---|---|---|
| PVC-1 | 182° C. | 182° C. | 182° C. | 193° C. | 100 | 82° C. |
| PC-1 | 249° C. | 260° C. | 260° C. | 265° C. | 80 | 82° C. |
| PSY-1 | 226° C. | 232° C. | 232° C. | 232° C. | 100 | 82° C. |
| PMMA-1 | 210° C. | 225° C. | 230° C. | 240° C. | 100 | 82° C. |

The sample for the Surface Roughness Measurement is made by sheet extrusion at a 0.125 thickness and the sample for total white light transmission(TWLT) is made by an injection molding machine with the same temperature profile as sheet extrusion conditions. The mold temperature as listed in the following: PVC-1 at 65.5° C. ; PC-1 at 71° C.; PSY-1 at 60° C.; PMMA-1 at 65° C.

Conclusion: The copolymer beads made by a suspension process can be used for different thermoplastic matrices at a 5–35% loading. All of the samples give a frosted, non gloss appearance, and textured surface, and the samples maintain good physical properties. The PMMA-1 sample gives a better light efficiency and surface texture. It is noted that the loading of the beads in polycarbonate should be lower in order to have better light transmission. All the samples have good hiding power, high light output and low object recognition.

The compositions all use 20% beads of 74.3% MMA/ 24.8% Styrene/0.9% ALMA and have a weight mean particle size of 57 micrometers. The beads were made as in Example 2C.

Frosted Matrix Polymer Data

| Matrix polymer | Total white light transmission (TWLT)[2] | Surface roughness[3] | Sample Appearance |
|---|---|---|---|
| PVC | 77.1% | 13.5 um | textured Translucent |
| PC | 28.9% | 4.3 um | textured Translucent |
| P-Styrene | 56.4% | 15.5 um | textured Translucent |
| PMMA[1] | 85.7% | 12.8 um | textured Translucent |

[1]Matrix polymer has a composition of 96% MMA/4% EA.
[2]TWLT-total white light transmission is determined by a Hunterlab colorimeter and the ASTM method is E1331 and E1164.
[3]Surface Roughness is determined by a Tencor ® Alpha-step 500 surface profiler and the ASTM method is B46.1.1, B361.2, and Y14.36.

EXAMPLE 5

Effect of Different Concentrations of Styrene/MMA/ALMA Crosslinked Beads in PMMA Matrix This experiment is designed to evaluate the concentration effect of the particles on the final product's surface texture, total light transmission, appearance, hiding power, and mechanical impact properties. The surface roughness measurement is made on a TENCOR Alpha-step 500 surface profiler. The appearance is evaluated visually. The total light transmission is a measurement of lighting efficiency. The Melt Flow Rate, used broadly by the those skilled in the art, gives the process flow information for the sample. The Dynatup impact test is used for mechanical impact properties.

In order to understand the best loading level of spherical particles made by the suspension process, samples are prepared by the sheet extrusion and injection molding methods using a rubber modified PMMA matrix (MMA/EA/BA/ Styrene). The suspension beads are compounded into the rubber modified matrix material through a Killion extruder equipped with a two stage medium work screw at the following conditions:

| Feed Zone | Compression Zone | Metering Zone | Die Zone | RPM |
|---|---|---|---|---|
| 225° C. | 235° C. | 235° C. | 240° C. | 100 |

The resin is then injection molded into parts, as known to those skilled in the art, for the analysis of light transmission, mechanical properties, and extruded into sheet sample at 0.125" thickness for surface texture analysis.

| Sample ID | Bead conc. %[1] | Dynatup[2] | Appearance | Surface roughness | Total Reflect light | Total white light transmission (TWLT) | MFR[3] |
|---|---|---|---|---|---|---|---|
| FST-0 | 0 | 8.3 ft-lb[4] | Clear/gloss | 0.128 um | 7.41% | 90.4% | 1.76 |
| FST-5 | 5 | 7.29 ft-lb | Gloss/ Transparent | 4.36 um | 7.46% | 88.9% | 1.23 |
| FST-10 | 10 | 7.04 ft-lb | matt/ transparent | 5.85 um | 7.44% | 85.8% | 1.10 |
| FST-15 | 15 | 6.10 ft-lb | Textured/ good | 6.38 um | N/A | 84.5% | 0.95 |
| FST-20 | 20 | 5.70 ft-lb. | Textured/ Excellent | 8.92 um | 8.16% | 83.4% | 0.81 |

[1] The composition of the beads is 74.3% MMA/24.8% styrene/0.9% ALMA. The amount of crosslinking is 0.9% (particle is highly crosslinked) and weight mean particle size is 48 micrometers. The beads were made as in Example 2B.
[2] Impact Strength is determined by a Dynatup impact tester (Model SFS), made by General Electric Research (ASTM D3763)
[3] MFR is an abbreviation of melt flow rate (ASTM D-1238, at 230 degree C., 3.8 kg), condition "I" and procedure "A"
[4] The significance of sample FST-0 with 0% beads having a 8.3 ft/lb ISFD while sample FST-20 with 20% beads having a 5.7 ft/lb ISFD is that standard PMMA polymer without rubber modification has an impact strength (Dynatup method) of 1.0 ft/lb, and rubber modified PMMA polymer has a falling dart impact strength of 8.3–10.0.0 ft/lb. Thus, the sample having 20% beads still has a very high impact strength comparing to the standard PMMA material (5.7 gy/lb vs 1.0 ft/lb).

Conclusion: Sample FST-20 has the most textured surface and the best appearance among all the samples prepared. The impact strength of this sample shows that the material maintains good impact properties.

EXAMPLE 6

This example relates to the effect of bead concentration on hiding power. The opacity results are in % units.

The samples used for this experiment are the same as those used in EXAMPLE 5. The samples tested are FST-05 which is 5% beads, 45% acrylic modifier, 50% PMMA, FST-10 which is 10% beads, 43% acrylic modifier, 47% PMMA, FST-15 which is 15% beads, 40% acrylic modifier, 44% PMMA, FST-20 which is 20% beads, 38.4% acrylic modifier, 41.6% PMMA.

The beads have a weight mean size: 57.1 microns. The samples are injection molded at a 0.125" thickness. Injection molded samples typically have a very smooth surface. The FST-20 sample when extruded into a 0.125" thickness sheet sample, has a opacity of 21.5% because of the textured surface. The same sample material when injection molded has an opacity of 17.68% due to the smooth surface.

| Sample | Opacity (ASTM D2805-80, (ASTM D589-65) | Transmission Haze (ASTM D1003) |
|---|---|---|
| FST-05 | 11.14% | 96.52% |
| FST-10 | 12.14% | 98.03% |
| FST-15 | 14.20% | 98.19% |
| FST-20 | 17.68% | 98.31% |

For a sample (at 0.125" thickness) to have a frosted appearance the Haze number must be at least 90% transmission as determined by ASTM D1003, or at least a 10% opacity as determined by ASTM D2805-80.

Other samples are measured:

| | Opacity |
|---|---|
| 20% beads in Polycarbonate | 85.3% |
| 20% beads in PVC | 18.41% |
| 20% beads in Polystyrene | 36.41% |

EXAMPLE 7

The Effect of the Amount of Crosslinking of the Particles on the Final Product

The suspension particles used for this experiment are made by the method described in Example 2B by varying the amount of allyl methacrylate in each sample. The particles have a weight mean particle size of 33 micrometers. The particles with different crosslinking levels are compounded into a rubber modified PMMA matrix through a Killion extruder and then passed through a sheet extruder to generate the samples for evaluation.

The loading of the particles in each sample is 20% beads and 80% rubber modified PMMA matrix. After multiple passes through the extruder, the particles with the lower level of crosslinking agent can not sustain their integrity and are deformed, which is a contributing factor for a non homogeneous surface texture of the sheet samples. The better samples are generated from the particles having at least 0.6% crosslinking agent. The sample VI-D gives the best results among the samples tested. The proper crosslinking in the suspension particles appears to be critical to the final appearance of the product.

| Sample | Amount of crosslinking agent used | Surface Appearance | Particle Appearance |
|---|---|---|---|
| VI-A | 0.2% | gloss | deformed |
| VI-B | 0.4% | gloss | deformed |

-continued

| Sample | Amount of crosslinking agent used | Surface Appearance | Particle Appearance |
|---|---|---|---|
| VI-C | 0.6% | acceptable | partially deformed |
| VI-D | 0.8% | textured | maintained integrity |

The present invention may be embodied in other specific forms without departing from the spirit or essential attributes thereof.

What is claimed is:

1. An extruded polymeric article having a frosted and textured surface appearance comprised of a polymeric matrix and polymeric particles which are substantially spherical, highly crosslinked, have a mean particle size of between 35 to 70 micrometers and have a particle size distribution between 10–110 micrometers wherein the article has:
   a) a Haze number as determined by ASTM D1003 of at least 90%,
   b) an opacity as determined by ASTM D2805-80 of at least 10%,
   c) a minimum surface roughness of 0.5 micrometers to 30 micrometers as measured using ASME methods B461.1 B461.2 and Y14.36; and
   d) a Total White Light Transmission of greater than 77.1% for the clear form, as determinated by a Hunterlab colorimeter_D25 model using ASTM E1331 and ASTM E1164,
wherein said determinations are made using an 0.125 inch thick extruded sheet comprised of the polymeric matrix and polymeric particles;
wherein said highly crosslinked polymeric particles arc comprised of:
15–35% by weight styrene;
65–85% by weight alkyl methacrylate or alkyl acrylate or a combination thereof; and
0.1–2.5% by weight crosslinking agent.

2. The article of claim 1 wherein the polymeric matrix is an acrylonitrile/butadiene/styrene terpolymer, acrylonitrile/styrene/acrylate copolymer, polycarbonate, polyester, polyethylene terephthalate glycol, methyacrylate/butadiene/styrene copolymer, high impact polystyrene, acrylonitrile/acrylate copolymer, polystyrene, styrene/acrylonitrile copolymer, methylmethacrylate/styrene copolymer, an acrylonitrile/methyl methacrylate copolymer, impact modified polyolefins, poly(vinyl chloride), impact modified poly (vinyl chloride), imidized acrylic polymer, acrylic polymer or impact modified acrylic polymer.

3. The article of claim 2 wherein the polymeric matrix is comprised of polymethyl methacrylate.

4. The article of claim 1 wherein a frosted appearance is achieved through the mismatch of the refractive indices of the polymeric particles and polymeric matrix by greater than 0.02.

5. The article of claim 1 comprised of
   a) 20–90% by weight, polymethyl methacrylate or alkyl methylacrylate/alkyl acrylate copolymer matrix;
   b) 0–50% by weight, modifiers; and
   c) 5–60% by weight, highly crosslinked spherical polymeric particles comprised of about 15–35% by weight, styrene; 65–85% by weight, alkyl methacrylate, or alkyl acrylate or a combination thereof; and 0.1–2.5% by weight crosslinking agent.

6. The article of claim 1 wherein the crosslinking agent is ethylene glycol dimethacrylate, divinylbenzene or alkyl methacrylate.

7. The article of claim 6 wherein the crosslinking agent is divinylbenzene.

8. The article of claim 6 wherein the crosslinking agent is allylmethacrylate.

9. The article of claim 6 wherein the polymeric particles contain a colorant.

10. A resin comprised of:
    a) 60–85% by weight, matrix comprised of polymethyl methacrylate; and
    b) 5–60% by weight, highly crosslinked spherical polymeric particles comprised of:
       15–35% by weight, styrene
       65–85% by weight, methyl methacrylate
       0.5–1.5% by weight, alkyl methacrylate;
wherein the polymeric particles have a mean particle size of 35–70 micrometers, and a particle size distribution of between 10–110 micrometers, and wherein a 0.125 inch thick sheet extruded from said resin, has a Haze number as determined by ASTM D1003 of at least 90%, an opacity as determined by ASTM D2805-80 would be at least 10%, a minimum surface roughness of 0.5 micrometers to 30 micrometers as measured using ASME methods B461.1 B36.1.2 and Y14.36 and a Total White Light Transmission of greater than 77.1% for the clear form measured by a Hunterlab colorimeter-D25 model using ASTM E1331 and ASTM E1164.

11. A resin comprised of:
    a) 20–90% by weight, matrix comprised of polymethyl methacrylate or alkyl methylacrylate/alkyl acrylate copolymer;
    h) 0–50% by weight, modifiers; and
    c) 5–60% by weight, highly crosslinked spherical polymeric particles comprised of about 15 to 35% by weight, styrene, 65–85% by weight, alkyl methacrylate, alkyl acrylate, or a mixture thereof and crosslinking agent wherein the polymeric particles have a mean particle size of 35–70 micrometers, and a particle size distribution of between 10–110 micrometers, and wherein a 0.125 inch thick sheet extruded from said resin, has a Haze number as determined by ASTM D1003 of at least 90%, an opacity as determined by ASTM D2805-80 would be at least 10%, a minimum surface roughness of 0.5 micrometers to 30 micrometers as measured using ASME methods B46.1.1 B36.1.2 and Y14.36 and a Total White Light Transmission of greater than 77.1% for the clear form measured by a Hunterlab colorimeter_D25 model using ASTM E1331 and ASTM E1164.

* * * * *

UNITED STATES PATENT AND TRADEMARK OFFICE
CERTIFICATE OF CORRECTION

PATENT NO.       : 7,067,188 B1
APPLICATION NO.  : 09/480193
DATED            : June 27, 2006
INVENTOR(S)      : Shi Jun Yang et al.

It is certified that error appears in the above-identified patent and that said Letters Patent is hereby corrected as shown below:

In the claims:

1. An extruded polymeric article having a frosted and textured surface appearance comprised of a polymeric matrix and polymeric particles which are substantially spherical, highly crosslinked, have a mean particle size of between 35 to 70 micrometers and have a particle size distribution between 10-110 micrometers wherein the article has:
    a) a Haze number as determined by ASTM D1003 of at least 90%,
    b) an opacity as determined by ASTM D2805-80 of at least 10%,
    c) a minimum surface roughness of 0.5 micrometers to 30 micrometers as measured using ASME methods B461.1 B461.2 B46.1-1, B46.1-2 and Y14.36; and
    d) a Total White Light Transmission of greater than 77.1% for the clear form, as determined by a Hunterlab colorimeter_D25 model using ASTM E1331 and ASTM E1164, wherein said determinations are made using an 0.125 inch thick extruded sheet comprised of the polymeric matrix and polymeric particles;
wherein said highly crosslinked polymeric particles are comprised of:
15 - 35% by weight styrene;
65- 85% by weight alkyl methacrylate or alkyl acrylate or a combination thereof; and 0.1 - 2.5% by weight crosslinking agent.

10. A resin comprised of:
    a)    60 - 85% by weight, matrix comprised of polymethyl methacrylate; and
    b)    5 - 60% by weight, highly crosslinked spherical polymeric particles comprised of:
        15 - 35% by weight, styrene
        65 - 85% by weight, methyl methacrylate
        0.5 - 1.5% by weight, allyl methacrylate;
wherein the polymeric particles have a mean particle size of 35 - 70 micrometers, and a particle size distribution of between 10 - 110 micrometers, and wherein a 0.125 inch thick sheet extruded from said resin has a Haze number as determined by ASTM D1003 of at least 90%, an opacity as determined by ASTM D2805-80 would be at least 10%, a minimum surface roughness of 0.5 micrometers to 30 micrometers as measured using ASME methods B461.1 B36.1.2 B46.1-1, B46.1-2 and Y14.36 and a Total White Light Transmission of greater than 77.1% for the clear form measured by a Hunterlab colorimeter-D25 model using ASTM E1331 and ASTM E1164.

UNITED STATES PATENT AND TRADEMARK OFFICE
CERTIFICATE OF CORRECTION

PATENT NO. : 7,067,188 B1
APPLICATION NO. : 09/480193
DATED : June 27, 2006
INVENTOR(S) : Shi Jun Yang et al.

It is certified that error appears in the above-identified patent and that said Letters Patent is hereby corrected as shown below:

11. A resin comprised of:
    a)      20 - 90% by weight, matrix comprised of polymethyl methacrylate or alkyl methlacrylate/alkyl acrylate copolymer;
    b)      0 - 50% by weight, modifiers; and
    c)      5 - 60% by weight, highly crosslinked spherical polymeric particles comprised of about 15 to 35% by weight, styrene, 65-85% by weight, alkyl methacrylate, alkyl acrylate, or a mixture thereof and crosslinking agent wherein the polymeric particles have a mean particle size of 35 - 70 micrometers, and a particle size distribution of between 10-110 micrometers, and wherein a 0.125 inch thick she~~et extruded from~~ said resin has a Haze number as determined by ASTM D1003 of at least 90%, an opacity as determined by ASTM D2805-80 would be at least 10%, a minimum surface roughness of 0.5 micrometers to 30 micrometers as measured using ASME methods B46.1.1 B361.2 <u>B46.1-1, B46.1-2</u> and Y14.36 and a Total White Light Transmission of greater than 77.1% for the clear form measured by a Hunterlab colorimeter D25 model using ASTM E1331 and ASTM E1164.

Signed and Sealed this

Tenth Day of October, 2006

JON W. DUDAS
*Director of the United States Patent and Trademark Office*